United States Patent Office 3,433,855
Patented Mar. 18, 1969

3,433,855
PROPYLENE-DIOLEFINIC HYDROCARBON BLOCK COPOLYMERS AND PROCESS FOR PREPARING SAME
Hugh J. Hagemeyer, Jr., and Marvin B. Edwards, Longview, Tex., assignors to Eastman Kodak Company, Rochester, N.Y., a corporation of New Jersey
No Drawing. Continuation of application Ser. No. 156,974, Dec. 4, 1961. This application Nov. 15, 1966, Ser. No. 594,630
U.S. Cl. 260—878
Int. Cl. C08f 15/04, 1/42

6 Claims

This application is a continuation of Ser. No. 156,974, filed Dec. 4, 1961, now abandoned.

This invention relates to novel polymers and methods for preparing the same. More particularly, the present invention relates to novel, solid, crystalline polymers prepared from propylene and di-olefinic hydrocarbons and to the process for their preparation.

In recent years, a number of high molecular weight polymers having a crystalline structure have been prepared, particularly from olefins, by subjecting the monomer to relatively mild conditions of temperature and pressure in the presence of solid stereospecific polymerization catalysts. Such polymers have been used extensively in a number of different applications including, for example, use in fibers, molding and coating applications, depending upon the specific properties of the polymers. The prior art crystalline polymers are, however, deficient as wholly desirable polymers for many uses since they do not exhibit the combination of good stiffness, tensile strength, elongation, impact strength, hardness and brittle point necessary for such uses. For example, a crystalline polymer having flow properties in the usable range, for example, a melt index in the range of about 2-5, in order to be suitable for most uses should combine a Vicat softening point of at least 138° C., a stiffness of at least 100,000 p.s.i., a tensile strength of at least 3,500 p.s.i., an elongation of at least 300 percent, an Izod impact strength (notched) of at least 1.5 foot pounds per inch notch, a tensile impact strength of at least 64 foot pounds per square inch, a Rockwell hardness on the R scale of at least 75 and a brittle point of less than 0° C. As already indicated, however, prior art crystalline polymers fail to exhibit the aforementioned combination of properties. Thus, crystalline polyethylene, in the aforementioned melt index range exhibits a Vicat softening point of only about 128° C., a stiffness of about 80,000 p.s.i., a maximum Izod impact strength (notched) of about 1 foot pound per inch notch, a maximum tensile impact strength of about 30 foot pounds per square inch, an elongation of about 300 percent and a Rockwell hardness on the R scale of about 70. Similarly, crystalline polypropylene, having a melt index of 2-5, although it exhibits a number of good physical properties, has an Izod impact strength (notched) of less than 0.5 foot pound per inch notch, a maximum tensile impact strength of about 30 pounds per square inch and a brittle point of about 23° C.

It is evident, therefore, that the state of the art will be greatly enhanced by providing a crystalline polymer which combines good stiffness, tensile strength, elongation, impact strength, hardness, Vicat softening point and brittle point. Likewise, a noteworthy contribution to the art will be a method for preparing such polymers.

Accordingly, it is an object of this invention to provide novel crystalline polymers.

Another object of this invention is to provide novel crystalline polymers which exhibit a combination of properties heretofore unattainable with crystalline polymers.

Still another object of this invention is to provide novel crystalline polymers having significantly improved specific properties, for example, tensile strength, stiffness and brittle points, when compared with prior art crystalline polymers.

Still another object of this invention is to provide novel crystalline polymers which, by virtue of their improved combination of properties, are particularly useful in molding applications where they exhibit superior moldability, low mold shrinkage, lower densities, better mold finish as well as having optimum film and fiber forming properties when compared with most crystalline prior art polymers.

Still another object of this invention is to provide a novel process for preparing the aforementioned novel crystalline polymers.

Other objects will become apparent from an examination of the description and claims that follow.

In order to accomplish these objects it was necessary to prepare entirely new crystalline polymers, i.e. polymers which are 100 percent insoluble in boiling hexane or show 100 percent crystallinity by X-ray diffraction, which differ markedly from prior art crystalline polymers in chemical composition and combination of physical properties. These novel polymers are solid, crystalline polymers in which the polymer chains comprise two separate and distinct crystalline segments, i.e. a "body" segment and a "tail" segment. The body segment is a polymerized crystalline chain of a polymerizable monomer which chain is terminated by a different polymerized monomer group. This terminating polymerized monomer group is also crystalline and comprises the minor portion of the polymer, by weight, when compared to the weight of body segment and is designated as the tail segment. There are numerous types of the novel polymers of this invention depending upon the nature of the crystalline body segment and the crystalline tail segment. Thus, there are di-hydrocarbon polymers in which each of the segments are crystalline polyhydrocarbon, for example, crystalline segments of polymerized olefinic or acetylenic hydrocarbons or mixtures thereof, as exemplified by ethylene, propylene, butene-1, styrene, butadiene, tetramethylbutadiene, isoprene, acetylene and the like. Still other types of novel polymers of this invention are those in which the crystalline body segments are polymerized propylene and the crystalline tail segments are polymerized ethylene and styrene. This type of polymer is a ternary polymer and would be designated propylene-ethylene-styrene polymer. Still other types of the novel polymers of this invention are hydrocarbon-vinyl polymers in which the crystalline body segments are hydrocarbon, for example, polymerized propylene, and the crystalline tail segments are polymerized vinyl compounds, for example vinyl chloride.

The novel polymers of this invention are not to be confused with prior art copolymers, amorphous or crystalline, since these prior art copolymers do not exhibit the excellent combination of properties or the chemical structure exhibited by the novel polymers. Thus, as exemplified by U.S. Patent 2,918,457, a crystalline copolymer can be prepared in slurry phase in an inert reaction medium by the simple expedient of subjecting a mixture of propylene and one or more other monomers to polymerization conditions in the presence of a solid, stereospecific polymerization catalyst. However, this type of process results in a copolymer having a random distribution of each of the polymerized monomers in the polymer chain and does not exhibit the stereoregular structure characteristic of the novel polymers of this invention. As a result, such a random copolymer must contain at least 7 percent butene-1 before the polymer will exhibit a brittleness temperature below 0° C. Furthermore, random copolymers prepared from mixtures of propylene and other α-monoolefinic hydrocarbons, for example, ethylene, have brittle points in excess of 7° C., as shown at column 4, lines 8–14 of the aforementioned patent. Moreover, as pointed out in U.S. Patent 2,918,457 at columns 3, lines 1–7, random copolymers of propylene and diolefinic hydrocarbons such as butadiene are either too brittle or are defective by reason of lowered tensile strength or lowered melting point. The random copolymers of the prior art exemplified by this patent contain polymer chains which can be represented by the structure AABABBBABA. In contrast, the novel polymers of this invention contain polymer chains represented by the formula AAAAABB wherein A and B are polymerized monomers, AAAAA is the crystalline body segment, and BB is the crystalline tail segment. It is the precise arrangement of the polymerized monomers in the polymer chains of the novel polymers of this invention that makes it possible for the polymers to exhibit the excellent combination of physical properties which distinguish them from crystalline polymers prepared heretofore.

Also, in prior art polymers prepared from two or more polymerizable monomers, it has often been found that the polymer is a blend containing large amounts of mixtures of homopolymers prepared from each of the polymers. These blends are, of course, quite distinct from the novel polymers of this invention since the latter contain the polymer components in a single polymeric chain. In preparing the novel polymers of this invention it is advantageous to use no more polymerizable monomer in the process than can be terminally attached to the crystalline body segments of the polymer chains in the polymer, the exact amounts being determinable by the polymer being produced and the polymerization conditions employed. By operating in this manner, it is possible to avoid the production of a poly blend or a prior art type of copolymer. Thus, the novel polymers of this invention can be prepared by polymerizing a crystalline tail segment of a polymerizable monomer onto a preformed crystalline body segment of the polymer chain formed from a different polymerizable monomer using a solid stereospecific polymerization catalyst.

The propylene polymers in which the polymer chains are polymerized propylene body segments terminated by crystalline tail segments of polymerized di-olefinic hydrocarbons are of particular interest. Thus, these propylene-di-olefinic hydrocarbon polymers exhibit the excellent Vicat softening points, impact strength, elongation, hardness and low brittle points characteristic of propylene-α-monoolefinic hydrocarbon polymers while, at the same time, exhibiting an increase in tensile strength and stiffness for the same weight percent of tail segment in the polymer.

The novel polymers of this invention can contain varying amounts of each of the monomers in polymeric form in a single chain, as is obvious to one skilled in the art. A wide variation of specific properties of a polymer can be achieved by appropriate selection of the monomers employed, the amounts of each monomer employed in preparing the polymer, polymerization conditions, and ratio of catalyst components used in forming the polymer. For example, propylene polymers in which the crystalline tail segments are polymerized butadiene and contain only 1.78 percent, by weight, of polymerized butadiene, exhibit a brittle point of −18° C., while a propylene polymer of comparable melt index, in which the crystalline tail segment is polymerized butadiene and contains 4.63 percent, by weight, of polymerized butadiene exhibits a brittleness temperature of −41° C.

As already indicated, propylene polymers in which the crystalline tail segment is polymerized di-olefinic hydrocarbon are of particular interest by virtue of their very desirable combination of properties, even with relatively small percentages, for example, 5 percent or less, by weight, of di-olefinic hydrocarbon in the polymer. In order to obtain such propylene polymers exhibiting the optimum combination of physical properties it is desirable that the polymer contain at least 80 percent, by weight, of polymerized propylene and at least about .1 percent, by weight, of di-olefinic hydrocarbon, in polymerized form. Thus, very desirable propylene polymers are those in which the crystalline body segments are polymerized propylene and the crystalline tail segments are di-olefinic hydrocarbons in polymerized form, which polymers contain about 80 to about 99.9 percent, by weight, of polymerized propylene and about .1 to about 20 percent, by weight, of the di-olefinic hydrocarbon in polymerized form. In general, such propylene polymers will exhibit molecular weights (Staudinger) of at least 10,000 and preferably molecular weights in the range of about 15,000 to about 100,000. The molecular weights of these polymers can be readily determined from their inherent viscosity in tetralin at 145° C. using the Staudinger equation. Thus, the inherent viscosity of these polymers in tetralin at 145° C. are at least 0.40, and preferably in the range of about .55 to about 2.4. In addition these polymers exhibit densities (ASTM D1505–57T) of at least 0.85, with densities in the range of about 0.87 to about 0.92 being preferred, and brittle points of less than 0° C.

As already indicated, the novel polymers of this invention are prepared in a multistage polymerization procedure comprising initially polymerizing a polymerizable monomer, for example, propylene and then polymerizing at least one different polymerizable monomer, for example, a di-olefinic hydrocarbon such as butadiene, in the presence of the polymer chain of the first monomer using a solid stereospecific polymerization catalyst. Thus, propylene or di-olefinic hydrocarbon, for example, is contacted with a solid stereospecific polymerization catalyst to form a crystalline polymer chain and the second monomer is then polymerized onto the preformed polymer chain in the presence of the solid stereospecific catalyst. To prepare the most desirable propylene polymers in which the polymer chains are crystalline body segments of propylene terminated by crystalline tail segments of di-olefinic hydrocarbons, the polymerization reaction is continued until the resulting polymer contains at least 80 percent, by weight, of polymerized propylene. This multistage process can be conducted in a single reactor having separate reaction zones preferably separated by a baffle or other separation means. However, the separate polymerization reactions forming our process can also be conducted in separate reactors arranged in series and alternatively the entire process could be carried out in an elongated tubular reactor. The novel polymers of this invention can also be produced batchwise by carrying out the first stage of the polymerization with a polymerizable monomer, for example, propylene or di-olefinic hydrocarbon and adding the second monomer after a portion of the first monomer, for example, 20–30 percent, has been polymerized. However, in the preparation of the propylene polymers it is preferred that the propylene be employed as the monomer in the first stage. The exact amount of monomer fed after the first stage of the reaction is subject to wide variation depending upon such variables as the reaction conditions employed, the percent of monomer converted in the first stage, the desired molecular weight of the resulting polymer and similar factors. Consequently the amount of monomer fed in a specific situation will depend upon the correlation of the several variable factors. However, in the case of the preferred propylene-di-olefinic hydrocarbon polymers this amount of monomer will be such that the resulting polymer contains at least .1 percent, by weight, of the di-olefinic hydrocarbon in polymerized form and at least 80 percent, by weight, of propylene, in polymerized form.

The solid stereospecific polymerization catalysts that are employed in practicing this invention are an important feature of the process. A number of these solid stereospecific catalysts are known in the prior art. These catalysts are initially mixtures of at least two components, the first component being, for example, a halide of a transition element from the fourth to the sixth subgroups of the Periodic Table and the second component being a metal of Group I-A or II or aluminum, or an alloy of metals of Group I-A and/or II and/or aluminum, or a halide or organo-metallic compound of a metal of Group I-A or II and/or aluminum, or a complex hydride or a complex organometallic compound of boron or aluminum and a metal of Group I-A or II of the Periodic Table found in "Langes Handbook of Chemistry," 8th edition (1952), published by Handbook Publishers, Inc. at pages 56 and 57, for example.

The transition metals included in Groups IV-B—VI-B of the Periodic Table are exemplified by metals such as titanium, zirconium, vanadium, molybdenum, chromium and the like. The transition metal halide catalyst components can be used at their maximum valence, or if desired, a reduced valency form of the halide can be employed. It is preferred to use the titanium chlorides which can be in the form of titanium tetrachloride, titanium trichloride or titanium dichloride. Examples of other transition metal halides that can be employed that can be employed in the process of this invention include titanium tetrabromide, titanium tribromide, zirconium tetrachloride, zirconium tetrabromide, vanadium trichloride, molybdenum pentachloride, chromium trichloride and the like.

Suitable second components which can be employed in conjunction with the transition element halides to form an effective solid, stereospecific polymerization catalyst include, for example, metal alkyls, metal alkyl halides and metal hydrides of aluminum or Group I-A and II as well as the metals alone. The preferred component is a lithium compound, as exemplified by lithium metal, lithium alkyl, lithium aluminum hydride, lithium aluminum alkyls, lithium borohydride and lithium aluminum compounds having the formula:

$$LiAlH_xR_y$$

wherein $x$ and $y$ are integers from 0 to 4, the sum of $x$ and $y$ is 4 and R is a hydrocarbon radical. Suitable Group I-A or II metals include sodium, potassium, lithium, zinc and the like. The alloys, halides, hydrides or organometallic compounds of these metals which can be employed include, for example, sodium amyl, potassium butyl, lithium propyl, zinc dibutyl, zinc diamyl, zinc dipropyl, ethyl magnesium bromide, sodium hydride, calcium hydride, lithium aluminum hydride and the like. Also, the catalyst composition can contain an organo aluminum compound such as aluminum triethyl, aluminum tributyl, ethyl aluminum dichloride, cyclohexyl aluminum dichloride, cyclobutyl aluminum dichloride, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like. If desired, a third component can be employed in order to increase the stereospecificity of the catalyst. Suitable third components include the halides of alkali metals, magnesium oxide, aromatic ethers, for example, diphenyl ether, hydrides of sodium, potassium and lithium and alcoholates of sodium, potassium, lithium, calcium, magnesium, barium, strontium, aluminum, titanium and zirconium. In addition, it is often desirable to employ tertiary amines and tertiary phosphoramides as third components with alkyl aluminum halides.

Catalysts employing lithium alkyls, lithium aluminum hydride, lithium hydride and lithium aluminum tetraalkyls in combination with the reduced valency form of the transition elements from the fourth to the sixth group of the Periodic Table are preferred for high temperature solution or melt polymerization procedures. These catalysts are particularly effective at temperatures above 120° C., for example, at 170° C. or higher, and at these elevated temperatures, it is possible to obtain propylene polymers containing less than 5 percent, and even less than 1 percent, by weight, of a di-olefinic hydrocarbon. Such propylene polymers exhibit a combination of properties that are completely unexpected, particularly in view of the small amounts of di-olefinic hydrocarbon present therein.

Generally, a mole ratio of second component to metal halide of 0.1:1 to 12:1 is satisfactory in the practice of the process. Where a third component is employed, the mole ratios of metal halide to third component of 0.25:1 to about 1:1 are generally satisfactory. The concentration of the catalyst in the reaction medium can be varied over a wide range. For example, catalyst concentrations of 0.1 percent or less, up to 3 percent or more can be used.

The temperature of the multistage polymerization process can be widely varied. However, temperatures ranging from about 0° C. to about 300° C. can generally be employed. When solid, stereospecific catalysts containing second components other than lithium and lithium compounds are employed, it is desirable to use temperatures of 100° C. or less. In slurry polymerizations at temperatures below 100° C., for example 80° C., the inherent viscosities of polymer can be controlled by the use of a chain terminating agent, for example, hydrogen. In melt or solution polymerization at temperatures above 100° C., desirably above 130° C. and preferably above 150° C., the inherent viscosity is controlled by selection of the reaction temperature and to a lesser extent by controlling pressure.

A suitable pressure range for the preparation of the novel polymers of this invention includes pressures from atmospheric to pressures of about 2,000 atmospheres or more. Generally, it is desirable to use pressures in excess of 15 or even 30 atmospheres with pressures in the range of about 50 to about 100 or even 500 atmospheres to obtain satisfactory rates of reaction. Elevated pressures, for example, 2 to 1,500 atmospheres are often required for polymerization reactions run in the absence of a solvent.

The organic vehicles or solvents that can be employed as reaction media in the process of this invention include aliphatic alkanes or cycloalkanes such as propane, pentane, hexane, heptane, cyclohexane and the like, or hydrogenated aromatic compounds such as tetrahydronaphthalene or decahydronaphthalene or a high molecular weight liquid paraffin or mixture of paraffins which are liquid at the reaction temperature or an aromatic hydrocarbon such as benzene, toluene, xylene and the like. The nature of the vehicle or solvent is subject to considerable variation but the solvent should be in liquid form at the reaction conditions and relatively inert to the reactants and reaction products. Other compounds that can be employed wtih good results include ethyl benzene, isopropyl benzene, ethyl toluene, n-propyl benzene, the diethyl benzenes, mono and dialkyl naphthalenes, n-pentane, n-octane, isooctane, methyl cyclohexane, mineral spirits and any of the other well known inert hydrocarbons.

In forming the propylene-di-olefinic hydrocarbon polymers, the di-olefinic hydrocarbons used to prepare the crystalline tail segments are readily polymerizable conjugated or non-conjugated di-olefinic hydrocarbons, and preferably the di-olefinic hydrocarbons containing 2 to 10 carbon atoms, as exemplified by 1,3-butadiene, isoprene, 2-ethyl-1,3-butadiene, 2,3-dimethyl butadiene, 1,1,4,4-tetramethyl butadiene, piperylene, hexadiene, heptadiene, and the like.

This invention can be further illustrated by the following examples of preferred embodiments thereof although it will be understood that these examples are included merely for purposes of illustration and are not intended to limit the scope of the invention unless otherwise specifically indicated.

EXAMPLE 1

Propylene-di-olefinic hydrocarbon polymers prepared by the multi-stage process of this invention, are a completely new class of crystalline polymers exhibiting a combination of properties not attainable in prior art crystalline polymers. To illustrate, 0.75 gram of LiAlH$_4$ (.02 mole) and 3.06 grams of TiCl$_3$ (.02 mole) slurried in 900 ml. of mineral spirits is charged to a 2-liter stirred autoclave. The polymerization is carried out at 1000 p.s.i.g. and 150° C. using propylene feed. After 15 minutes 3.2 ml. of isoprene is pumped into the autoclave and the polymerization continued for 5 minutes. The autoclave is discharged through a filter to remove the catalyst. The hot polymer dope is concentrated by stripping with propylene at 190° C. and the molten polymer extruded into a water bath and chopped into ⅛-inch pellets. The pellets contain 13% volatiles (mineral spirits) which are removed by extraction with acetone. The pellets are then extracted for 24 hours with boiling hexane to remove amorphous polymer. The yield of crystalline propylene-isoprene polymer is 203 grams and 19 grams of amorphous polymer is recovered from the hexane. The crystalline propylene-isoprene polymer contains 0.3% isoprene.

To illustrate the superior combination of physical properties of the novel polymers of this invention over prior art types of crystalline polymer, propylene is polymerized using the above procedure to form crystalline polypropylene. The physical properties of the crystalline polypropylene, and the propylene-isoprene polymer are set forth in the following table.

TABLE 1

| Physical properties | Poly-propylene | Propylene-isoprene polymer |
|---|---|---|
| Density (ASTM D1505) | 0.9086 | 0.9150 |
| Brittleness temperature (ASTM D746) | >+20 | −7 |
| Inherent viscosity in tetralin (ASTM 72-39) | 1.70 | 1.72 |
| Tensile strength (ASTM D638) at 2″/min., p.s.i.: | | |
| At fracture | 2,600 | 4,920 |
| At yield | 4,540 | 5,260 |
| Elongation, percent | 210 | 300 |
| Stiffness in flexure (ASTM D747) p.s.i. | 125,000 | 177,000 |
| Vicat Softening Point (ASTM D1525), ° C. | 144 | 150 |

From an examination of the above table it can readily be seen that the propylene-isoprene polymer exhibits significantly increased tensile strength, Vicat softening point and stiffness as well as a significantly decreased brittle point when compared with the crystalline polypropylene. The decrease in brittleness temperature and increase in tensile strength and stiffness give the polymer a distinct advantage over crystalline polypropylene in injection molding, film and fiber applications.

Although propylene-α-monoolefinic hydrocarbon polymers having the same segmented structure as the novel polymers of this invention exhibit much lower brittle points, higher stiffness and higher tensile strength than prior art crystalline polymers of comparable molecular weight, they do not exhibit quite as good stiffness and tensile strength as the propylene-di-olefinic hydrocarbon polymers of this invention. To illustrate, comparative data for propylene polymers containing 0.7% by weight of ethylene or isoprene and crystalline polypropylene are set forth in the following table. The three polymers set forth in the table are made in a continuous unit employing two stirred reactors in series. The catalyst used is a 1/1/1 mole ratio of LiAlH$_4$/TiCl$_3$/NaF and the reactor conditions are 160–163° C. at 1000 p.s.i.g. The segmental polymers are produced by feeding isoprene or ethylene to the second reactor.

TABLE 2

| Physical properties | Poly-propylene | Propylene-isoprene polymer | Propylene-ethylene polymer |
|---|---|---|---|
| Percent isoprene | | 0.7 | |
| Percent ethylene | | | 0.7 |
| Density | 0.9086 | 0.9130 | 0.9066 |
| Brittleness temperature | >+20 | −18 | −26 |
| Inherent viscosity in tetralin (ASTM 72-39) | 1.70 | 1.74 | 1.81 |
| Tensile Strength (ASTM D638) at 2″/min., p.s.i.: | | | |
| At fracture | 2,600 | 4,230 | 3,030 |
| At yield | 4,540 | 4,840 | 3,740 |
| Elongation, percent | 210 | 200 | 650 |
| Stiffness in Flexure (ASTM D747), p.s.i. | 125,000 | 163,000 | 92,600 |
| Vicat softening point (ASTM D1525), ° C. | 144 | 150 | 134.6 |

EXAMPLE 2

Five runs are made to prepare propylene-isoprene polymers and the procedural aspects, together with the results of these runs are set forth in the following table. The gross polymer is extacted by refluxing in hexane for 24 hours to obtain the crystalline polymer.

TABLE 3

| Catalyst components | Mole ratio of components | Polymerization conditions | | | Percent isoprene in Polymer | Brittleness temperature |
|---|---|---|---|---|---|---|
| | | Solvent | Temp., ° C. | Pressure (p.s.i.g.) | | |
| Li/TiCl$_3$/diphenyl ether | 5/1/1 | Cyclohexane | 190 | 1,000 | 11.0 | −42 |
| Li/LiAlH$_4$/TiCl$_3$/NaF | 2/0.5/1/1 | Mineral spirits | 175 | 1,000 | 2.78 | −33 |
| Et$_3$Al$_2$Cl$_3$/TiCl$_3$/MgO | 1/1/1 | ___do___ | 80 | 770 | 1.12 | −18 |
| Et$_3$/VCl$_3$/Al(OPr)$_3$ | 2/1/0.5 | Cyclohexane | 85 | 400 | 1.92 | −20 |
| Et$_3$Al$_2$Cl$_3$/TiCl$_3$/((CH$_3$)$_2$N)$_3$P=O | 2/3/1 | Mineral spirits | 80 | 770 | 3.65 | −26 |

EXAMPLE 3

Aluminum triethyl (5.0 ml.) and titanium tetrachloride (2.4 ml.) are added to 900 ml. of heptane and charged to a 2-liter stirred autoclave. Propylene is charged in and the polymerization started at 80–85° C. and 700 p.s.i.g. After 30 minutes 5 grams of butadiene is charged in and the polymerization continued for one hour.

The autoclave is cooled and the propylene-butadiene polymer is recovered by filtration and washed free of catalyst with isobutanol at 106° C. The gross polymer thus obtained weighs 266 grams and is 83% crystalline. The amorphous polymer is separated from the crystalline propylene-butadiene polymer by extraction with refluxing hexane.

The properties of the gross polymer are: percent, by weight, butadiene 1.89, density 0.9001, brittleness temperature −33° C., and stiffness in flexure 92,000 p.s.i.

The properties of the crystalline propylene-butadiene polymer are: percent butadiene 1.12, density 0.9150, brittleness temperature −19° C. and stiffness in flexure, 151,000 p.s.i.

EXAMPLE 4

Propylene polymers in which the tail segments are polymerized butadiene, isoprene, or piperylene are produced in a two-stage reaction employing two 500-gallon stirred reactors in series as follows:

Propylene and mineral spirits are fed to the first reactor at the rates required to maintain 25–30% polymer and 18–20% propylene. Polymerization conditions are 1000 p.s.i.g. and temperatures range from 155 to 175° C. as required to maintain an average inherent viscosity in the reactors of 2.1–2.3.

The effluent from the first reactor is led to the second reactor where the same conditions of temperature and pressure are maintained. The di-olefin in the desired amount is fed to the second reactor.

The polymer solution from the second reactor is let down to 50 p.s.i.g. and heated to 180° C. in a dilution tank. Sufficient mineral spirits is added to the dilution tank to give a solids concentration of 8–10%. The polymer solution is then pumped through a pressure filter to remove the catalyst. After the filter the polymer is concentrated by passing a stream of propylene heated to 180–190° C. countercurrent to the polymer melt to remove solvent. The molten polymer is then extruded into water, pelleted, and the pellets conveyed to a continuous extraction system where the amorphous fraction is removed by extraction with boiling hexane.

The results of six runs using the procedure described hereinabove are set forth in the following table.

droxy toluenes and the like can be employed with good results. Specific antioxidants which can be employed include 4,4′-butylidene-bis(6-tert. butyl-meta-cresol),
dilauryl-3,3′-thio-dipropionate,
N-butylated-p-amino phenol,
N,N′-disecondarybutyl-p-phenylene-diamine,
2,6-ditertiarybutyl-p-cresol,
2,6-ditertiary butyl-4-methyl phenol,
disalicylal propylene di-imine,
N,N-disalicylidene-1,2-diaminopropane,
N,N′-di(1-methyl heptyl)-p-phenylenediamine,
N,N′-di-2-octyl-p-phenylenediamine,
N,N′-di(1-ethyl-3-methyl pentyl)p-phenylenediamine,

TABLE 4

| Run No. | Catalyst components | Mole ratios of components | Polymerization conditions | | | Percent, by weight di-olefin in crystalline polymer | Percent crystallinity | Brittleness temp. (° C.) |
|---|---|---|---|---|---|---|---|---|
| | | | Temp. (° C.) | Pressure (p.s.i.g.) | Di-olefin | | | |
| 1 | LiAlH₄/TiCl₃/NaF | 1/1/1 | 158 | 1,000 | Butadiene | 4.63 | 76.0 | −41 |
| 2 | LiAlH₄/TiCl₃/NaF | 1/1/1 | 163 | 1,000 | Isoprene | 2.12 | 77.9 | −26 |
| 3 | LiAlH₄/TiCl₃/NaF | 1/1/1 | 161 | 1,000 | Piperylene | 3.01 | 85.6 | −27 |
| 4 | Li/LiAlH₄/TiCl₃/NaF | 2/0.5/1/1 | 174 | 1,000 | Butadiene | 1.78 | 91.4 | −18 |
| 5 | Li/LiAlH₄/TiCl₃/NaF | 2/0.5/1/1 | 171 | 1,000 | Isoprene | 1.24 | 92.0 | −23 |
| 6 | Li/LiAlH₄/TiCl₃/NaF | 2/0.5/1/1 | 176 | 1,000 | Piperylene | 3.71 | 88.6 | −19 |

The propylene-di-olefinic hydrocarbon polymers of this invention are preferred for many applications by virtue of their very excellent combination of physical properties, including, for example, low brittle points, high stiffness and high tensile strength. By virtue of these improved properties the propylene-di-olefinic hydrocarbon polymers, can be used as substitutes for crystalline polypropylene in applications where these properties are of significance, for example, in molding, film and fiber applications. The propylene polymers of this invention have many advantages in specific uses. For example, in fibers and mono-filaments these propylene polymers, are superior to crystalline polypropylene in that they draw down less and afford tougher filaments resulting in fewer breaks when spinning the finer deniers. Such fibers and filaments can be made in varying deniers and cross sections, and find use as staple or continuous filament yarns and tows, both bulked and unbulked. Such polymer fibers, filaments, tows and yarns find use in textile applications, rugs, industrial fabrics, batts, filters (including cigarette filters) and various other applications where their unique combination of properties make them particularly useful. In films, the propylene polymers of this invention have superior toughness, tear resistance and impact strength while exhibiting excellent optical properties. These same advantages also apply to magnetic tape base and photographic film base prepared from the propylene polymers.

In wire covering and cable jacketing the propylene-di-olefinic hydrocarbon polymers of this invention offer the advantage of better impact strength, elongation, stress crack resistance and low temperature toughness. The same advantages can be attained when the propylene-di-olefinic hydrocarbon polymers are employed in paper coatings as well as in other surface coatings and laminates with both fibrous and non-fibrous materials, such as laminates with other resins on other polymers disclosed herein or with foils or the like. In molded and extruded articles, one very significant advantage of the propylene-di-olefinic hydrocarbon polymers is low temperature toughness. In all of the aforementioned uses, the ease of processability of the polymers of this invention is an important advantage over many of the high molecular weight solid polymers known in the prior art, for example, high density polyethylene and acrylonitrile-butadiene-styrene polymer resins.

The propylene polymers disclosed herein can be stabilized with a variety of antioxidants, alone or in admixture. Thus, for example, the N,N-dialkyl dithiocarbamates, alkyl phenyl salicylates, N,N-diphenyl-p-phenylene-diamines, 2-hydroxy benzophenones or butylated hy- N,N′-di-3(5-methyl heptyl)-p-phenylenediamine,
N-1, N-3 dioleoyldiethylene triamine,
cresylic acid, diacetone alcohol, isopropanol, toluene, mixed xylenes, butylated hydroxyanisole butylated hydroxytoluene, propyl gallate, citric acid, propylene glycol, vegetable oil, sodium silico aluminate, mixed glycerides, glyceryl monooleate, diisobutyl adipate or mixtures thereof. A particularly effective synergistic mixture is one comprising dilauryl thiodipropionate with 4,4′-butylidene-bis (6-tert. butyl-meta-cresol), or butyl hydroxy toluene. Metal soaps such as calcium stearate can be added, preferably at concentrations of 1 percent or less, to enhance stability and improve mold release properties of the novel polymers of this invention. Slip agents such as oleamide or erucylamide or antiblock agents such as colloidal silica may also be added particularly where the propylene-di-olefinic hydrocarbon polymers are to be used for film. Furthermore, pigments, extenders, plasticizers or fillers, as exemplified by titanium oxides, calcium hydroxide or silicates, can be added to the novel polymer of this invention. For use in fiber formation, mixtures of propylene polymers disclosed herein, with polyesters or polyamides, for example, nylon, can be used in order to obtain improved dye affinity together with optimum fiber properties. In addition, the propylene polymers disclosed herein can be thermally degraded at temperatures above their critical temperatures to form useful products. Low molecular weight liquid and waxy polymers also can be made and show excellent adaptability for specialized uses. The novel polymer of this invention are also used in wrapping materials, fluid containers, fluid conduits or like articles.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A polymer in which the polymer chains are crystalline polymerized propylene body segments terminated by crystalline tail segments of polymerized di-olefinic hydrocarbon, said polymer having a molecular weight of at least 10,000, a density of at least 0.85, a brittle point below 0° C. and containing at least 80 percent, by weight, of polymerized propylene.

2. The polymer of claim 1 wherein the di-olefinic hydrocarbon contains from 2 to 10 carbon atoms, and comprises at least 0.1 percent by weight of said polymerized di-olefinic hydrocarbon.

3. The polymer of claim 1 wherein the polymerized di-olefinic hydrocarbon comprises no more than about 5 percent by weight of said polymer.

4. The polymer of claim 1 wherein the di-olefinic hydrocarbon is isoprene and comprises in polymerized form from about 0.1 to about 5 percent by weight of said polymer.

5. The polymer of claim 1 wherein the di-olefinic hydrocarbon is butadiene and comprises in polymerized form from about 0.1 to about 5 percent by weight of said polymer.

6. The polymer of claim 1 wherein the di-olefinic hydrocarbon is piperylene and comprises in polymerized form from about 0.1 to about 5 percent by weight of said polymer.

References Cited

FOREIGN PATENTS 839,996   6/1960   Great Britain.

OTHER REFERENCES

Natta, Journal of Polymer Science, 34, 531–549 (1959).

MURRAY TILLMAN, *Primary Examiner.*

M. J. TULLY, *Assistant Examiner.*

U.S. Cl. X.R.

260—23.7, 33.6, 41.5, 45.85, 45.9, 45.95, 859, 873, 879; 161—217, 253; 117—128.7, 155